Sept. 3, 1968     A. J. NAFFZIGER     3,399,483

FISHING LURE

Filed March 2, 1967     2 Sheets-Sheet 1

INVENTOR.
Arthur J. Naffziger
BY
J. H. SLOUGH
ATTORNEY

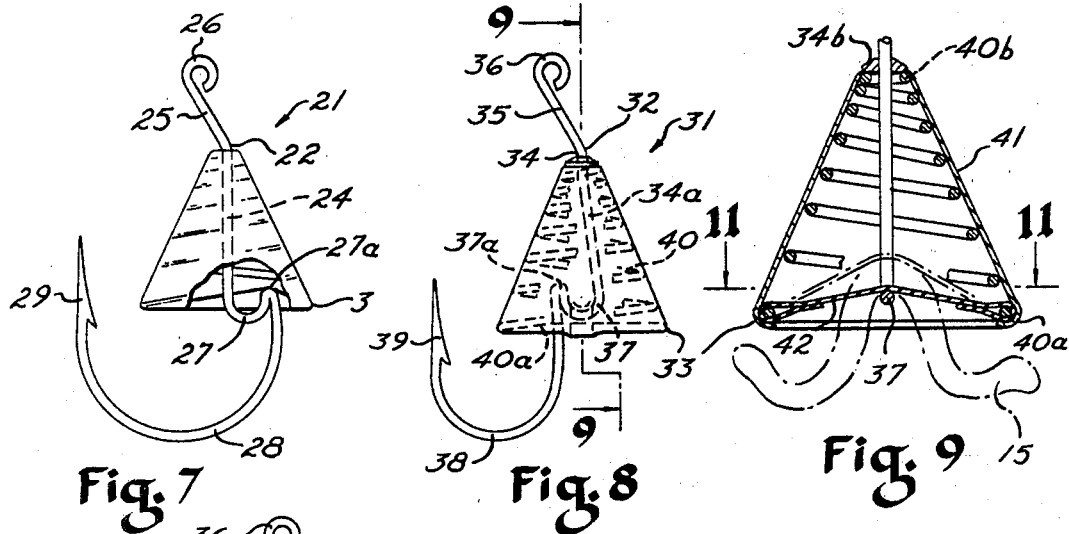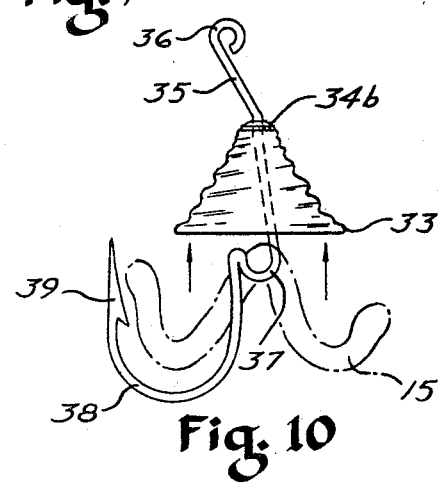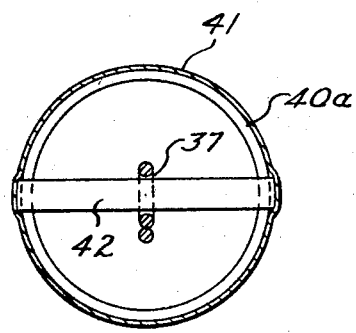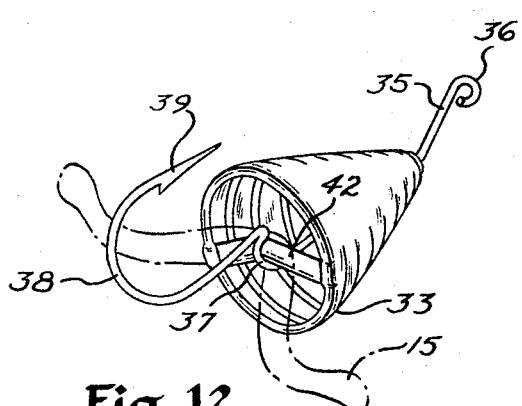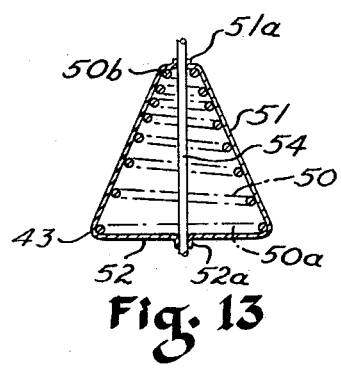

United States Patent Office 3,399,483
Patented Sept. 3, 1968

3,399,483
FISHING LURE
Arthur J. Naffziger, R.R. 2, Delavan, Ill. 61734
Filed Mar. 2, 1967, Ser. No. 620,140
9 Claims. (Cl. 43—44.4)

ABSTRACT OF THE DISCLOSURE

A fishhook having two hook portions one of which is adapted for mounting live bait thereupon in an unimpaled manner. The fishhook is provided with a hood having a portion for resiliently maintaining the bait on said one hook portion.

---

This invention relates to fishing tackle and more particularly to a fish lure and hook having an improved manner of securing the bait thereto.

It is an object of this invention to provide a fish lure having means for securing live bait thereto without injury to or impaling the bait whereby it will remain alive for long periods of time and be sufficiently free in movement to add additional lure to the fish.

It is a further object of the invention to provide a fish lure as set forth above which may be used as a subsurface fishing lure or, with slight modification, as a surface or floatable lure.

Yet another object of the invention is to provide a fish lure having the above characteristics which may be provided with either a small or large hook with but slight change in the basic design thereof.

Yet another object of the invention is to provide a fish lure as set forth above comprising a cone-shaped helical or spiral wound frame having a cover stretched thereover, the shank of a fishhook disposed axially through said cone-shaped frame, and a bottom member disposed across the larger open end of said frame cooperating with a portion of the hook to resiliently and securely retain live bait connected to said lure.

Another object of the invention is to provide a fish lure of the above type having openings in said cover at both ends of the cone-shaped frame whereby water may enter freely thereby causing the lure to sink for subsurface fishing.

A still further object of the invention is to provide a fish lure as set forth with the exception that the cover completely encases the cone-shaped frame and is watertight with respect to the shank of the fishhook whereby the lure may be used as a surface lure.

Still another object of the invention is to provide an improved fish lure having a cover which is attractive to fish and serving as a lure to the same.

Yet another object of the invention is to provide a fish lure of the type set forth above which is simple in construction, relatively inexpensive in manufacture, and highly durable and efficient in use.

Other objects of the invention and the invention itself will become more readily apparent by reference to the appended description and the accompanying drawings, in which said drawings:

FIGURE 7 is a side elevation of a second embodiment of the invention, similar to FIGURE 1.

FIGURE 8 is a side elevation of a third embodiment of the invention.

FIGURE 9 is an enlarged section taken along the line 9—9 of FIGURE 8.

FIGURE 10 is a side elevation of the third embodiment of the invention showing the parts thereof in relatively different operative positions.

FIGURE 11 is a transverse section taken along the line 11—11 of FIGURE 9.

FIGURE 12 is a perspective view similar to FIGURE 5 showing a third embodiment of the invention.

FIGURE 13 shows a forth embodiment of the invention in fragmentary, sectional detail, said embodiment involving a modification of the first embodiment on FIGURES 1–6.

Figure 1:
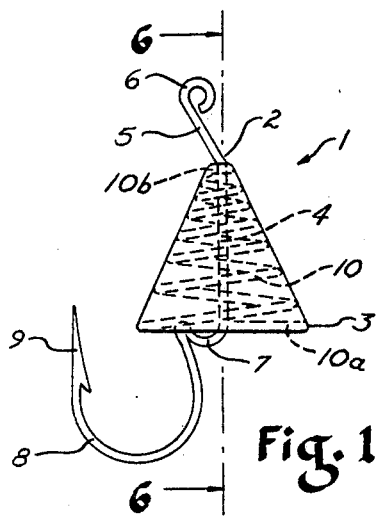
FIGURE 1 is a side elevation of a first embodiment of the fishing lure of this invention.

Referring now to the drawings in all of which like parts are designated by like reference characters, and referring particularly to FIGURES 1–6 illustrating the first embodiment of the invention, a fish lure is generally shown at 1 comprising a fishhook 2 and a conical hood 3. The fishhook 2 is preferably formed from a single piece of steel wire which has been suitably hardened, and comprises a straight shank portion 4 surmounted by a laterally angled shank portion 5 having a line connecting loop 6 at the upper end thereof. At the lower end of the straight shank portion 4, the wire is curved to form a bait retaining hook 7 and then folded back again upon itself and provided with a larger hook 8 terminating in a barb 9 of conventional form. Both the bait retaining hook 7 and the larger hook 8 are curved in the same direction relative to the straight shank portion 4, and the angled shank portion 5 is tilted in the same direction in which said hooks are curved.

The hood 3 preferably comprises a helical or spiral wound coil spring 10 the separate coils of which are progressively reduced in diameter along the axis of said spring whereby said spring provides a wire frame which is resiliently compressive in the direction of its axis. The straight shank portion 4 of the fishhook 2 is disposed through the center of the hood 3, generally coaxial with the coil spring 10, with the apex of said spring being located generally at the juncture between said straight shank portion and the angled shank portion 5 and with the largest or lowermost coil 10a of said spring surrounding the bait retaining hook 7.

The conical coil spring 10 is provided with a fitted cover 11 having a bottom portion 12 and tapering at the top thereof sufficiently to retain the uppermost or smallest coil 10b of the coil spring 10 within said cover. The bottom portion 12 of the cover 11 is provided with an enlarged, central opening 13 which is substantially larger than the shank portion 4 which it surrounds, and the upper end of the cover is also provided with an opening 15 which is also larger in diameter than said straight shank portion. The openings 13 and 14 allow water to flow freely into and through the cover 11 whereby the lure of the first embodiment of the invention will tend to sink for purposes of subsurface fishing.

The cover 11 may be made of a suitable elastic sheet material such a plastic or the like and is tautly drawn over the frame provided by the coil spring 10. However, the cover may also be of nonelastic fabric but of such dimension as to hold the coil spring 10 under slight compression whereby said coil spring will hold said cover in a taut condition.

Figure 2:
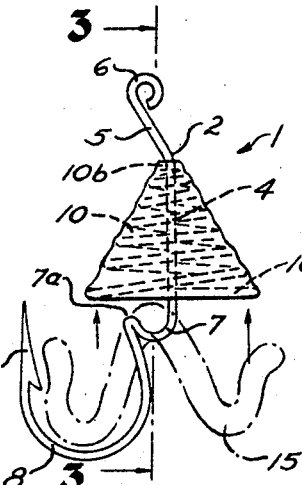
FIGURE 2 is a side elevation of said first embodiment showing the parts thereof in relatively different operative positions.
Figure 3:
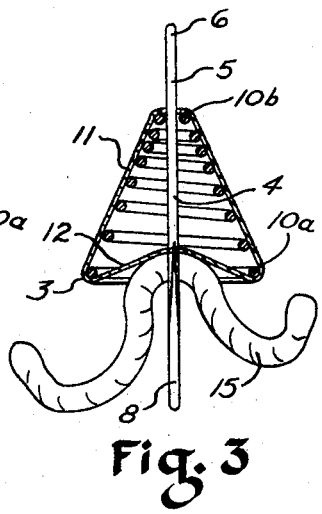
FIGURE 3 is a vertical section taken generally along the line 3—3 of FIGURE 2.
Figure 4:
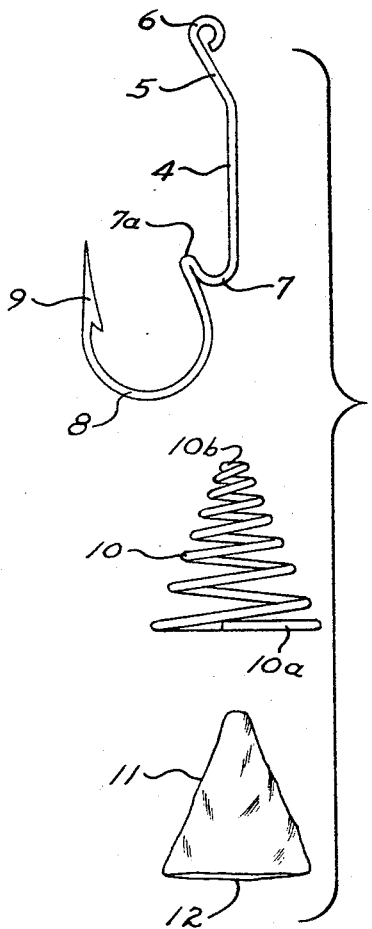
FIGURE 4 is an exploded view of the separate parts of the first embodiment of the invention.
Figure 5:
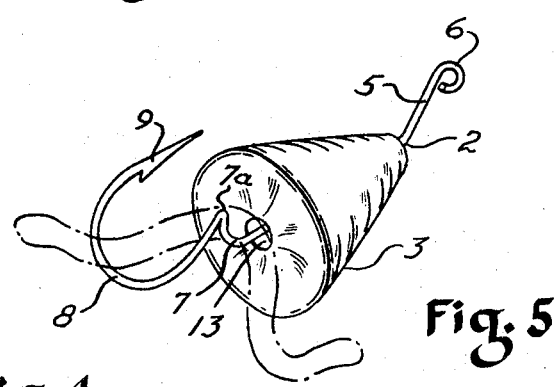
FIGURE 5 is a perspective view of the first embodiment.
Figure 6:
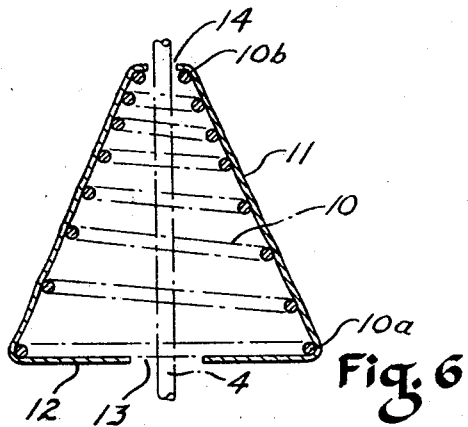
FIGURE 6 is an enlarged section taken along the line 6—6 of FIGURE 1.

FIGURE 2 illustrates the manner in which live bait is secured to the fish lure 1, and FIGURE 3 shows the manner in which said live bait is retained by said lure without injury to the bait. To attach the bait to the lure, the fisherman simply compresses the coil spring 10 in the direction of its axis thereby moving the largest coil 10a of said spring upwardly away from the bait retaining hook 7 or in the direction indicated by the arrows in FIGURE 2. This raises the cover 12 and exposes the hook 7 whereby the bait, herein illustrated in the form of an earthworm, 15, may be readily placed unimpaled into the loop of said hook 7. It will be noted that the folded portion of the hook 7, as indicated at 7a, where the wire is folded back on itself, provides a blunt end which will not accidentally snag, tear, or injure the bait when it is placed upon the hook 7.

The coil spring 10 is then released to enable it to assume the position illustrated in FIGURE 3 whereby the bottom portion 12 of the cover 11 presses resiliently downwardly and firmly upon the earthworm 15 and retains said worm alive and uninjured upon the lure 1. By being retained in this manner, the bait will remain alive for long periods of time whereby its wriggling movements provide added lure for the fish.

FIGURE 7 illustrates a second embodiment of the invention in which the fishhook has been modified in form but where in the conical hood remains unchanged. Therefore, the hood of the second embodiment will be referred to by the same reference characters as the hood in the first embodiment, with new numerals being given only to the modified fishhook.

The second embodiment of the invention comprises a fish lure generally indicated at 21 having a modified fishhook 22 disposed axially through a conical hood 3. The fishhook 22 has a straight shank portion 24 surmounted by an angled shank portion 25 which terminates at its upper end in a line retaining loop 26. The lower end of the shank portion 24 carries a bait retaining hook 27, the wire being folded back upon itself to provide a blunt end portion 27a and projecting downwardly from said blunt end portion is a larger hook 28 which terminates in a backwardly or upwardly directed barb 29. It will be readily noted from the illustration of FIGURE 7 that in the second embodiment of the invention the bait retaining hook 27 is curved in the opposite direction from that of the larger hook 28. Because of this opposite curving of the hooks, said hook 28 can be and is much larger than the hook 8 of the first embodiment although the overall lateral width of the lure is not substantially increased. It will be understood that the gauge of the wire from which the fishhook 2 or 22 is made varies commensurate with the size of the larger hook 8 or 28, respectively, and the size of the fish to be caught with a particular lure.

In the third embodiment of the invention, illustrated in FIGURES 8–12, a fish lure is generally shown at 31 which comprises a fishhook 32 and a conical hood 33. The fishhook 32 comprises a short, straight shank portion 34 surmounted by an angled shank portion 35 which terminates at its upper end in a line retaining loop 36. Below the straight shank portion 34, there is provided a second straight portion 34a which is preferably angled slightly in a direction opposite to the angle of the portion 35; and the lowermost end of said portion 35 carries a backwardly turned, bait retaining hook 37. The wire is then folded downwardly and back upon itself as in the first embodiment to provide a blunt end portion 37a, and a large hook 38 terminating in an upwardly directed barb 39 is provided below said blunt end portion. As in the first embodiment of the invention, both of the hooks 37 and 38 are turned in the same direction as the shank portion 35 is angled.

The hood 33 comprises a helical or spiral wound, cone-shaped coil spring 40 which is telescoped over the fishhook 32 with its largest coil 40a normally disposed below the bait retaining hook 37 and its smallest coil 40b disposed around the straight shank portion 34. The straight shank portion 34 carries a stop 34b which may be made of lead or other metallic substance and crimped or otherwise suitably secured to said shank portion to limit the upward movement of the coil spring 40.

A cover 41 of the same general type and material as that described as in connection with the first embodiment of the invention is disposed over the coil spring 40, encompassing the same from the largest coil 40a to the smallest coil 40b thereof. The lower and upper edges of the cover 41 are secured to the coils 40a and 40b, respectively, in any suitable manner such as adhesively bonding them in place or rolling the edges around the said coils.

An elastic strap 42 is disposed diametrically across the largest coil 40a in a direction at right angles to the plane of the bait retaining hook 37, the central portion of said elastic strap being normally seated in the bottom of said bait retaining hook. The ends of said elastic strap 42 are connected at opposite peripheral points on the largest coil 40a in any suitable manner such as by making a single turn around the coil and folding the strap back upon itself at which point the free end is bonded or otherwise suitably secured to the main body of the strap. As illustrated in FIGURE 9, the elastic strap 42 is stretched under tension over the bait retaining hook 37, and as shown in FIGURE 12, except for said strap, the bottom of the hood 33 is completely open to admit water for subsurface fishing.

The live bait or earthworm 15 is placed within the bait retaining hook 37 after first compressing the coil spring 40 in an axial direction away from said bait retaining hook in the direction indicated by the arrows in FIGURE 10. This raises the elastic strap 42 out of the bait retaining hook 37 whereby the worm 15 may be inserted in the manner set forth in connection with the first embodiment of the invention. Upon releasing the coil spring 40, the elastic strap 42 is brought firmly against the midportion of the worm 15 in such manner as to retain it in place alive, uninjured, and still wriggling.

The final embodiment or modification of FIGURE 13 involves a change in the construction of the hood cover which said change may be made in either the first or second embodiments as will be readily understood. FIGURE 13 shows a straight shank portion 54 of a fishhook which said shank portion is encompassed by a helical, cone-shaped coil spring 50 affording the inner frame of a conical hood 43. The coil spring 50 is provided with a cover 51 which is drawn tautly over the coil spring frame and has a bottom portion 52 stretched over a largest coil 50a of said coil spring. In this embodiment, the cover 51 is provided with a neck portion 51a which is drawn tightly around the shank portion 54 above an upper, smallest coil 50b of the coil spring 50. The bottom portion 52 is similarly provided with a small neck portion 52a which also fits tightly around the said shank portion 54. The neck portions 51a and 52a are preferably sealed in a watertight relation to the shank of the fishhook whereby the fish lure of this final embodiment is floatable for surface fishing.

From the foregoing it will be seen that the present invention provides a fish lure having means for firmly retaining live bait thereto whereby the bait is uninjured and enabled to wriggle freely to attract the fish. The cover for the conical hood may, in each embodiment, be of a color or design attractive to fish, thereby adding to the lure of the same and the present invention is readily adaptable for the manufacture of fish lures having fish hooks of greatly varying sizes.

What I claim is:

1. A fish lure comprising a fishhook having a shank, a line connecting means at one end of said shank, and a barbed hook at the other end of said shank, said fishhook having a bait retaining hook disposed between said connecting means and said barbed hook for receiving bait thereon, and holding means associated with said fishhook for retaining bait upon said retaining hook, said fishhook being formed from a single piece of wirelike material, said material being curved backwardly toward said one end at a medial portion thereof to form said bait retaining hook and then folded back on itself to form an end for said bait retaining hook, and said material being curved backwardly toward said one end a second time to form said barbed hook.

2. A fish lure as set forth in claim 1; said holding means comprising a wirelike frame having portions thereof disposed laterally outwardly at diametrically opposite points on either side of said retaining hook and flexible means connected to said portions and drawn tautly across said retaining hook to retain bait placed upon said retaining hook.

3. A fish lure as set forth in claim 2; said frame being resiliently compressible in the direction of the axis of said shank whereby said portions and said flexible means are movable away from said bait retaining hook to allow bait to be placed thereon.

4. A fish lure comprising a fishhook having a shank, a line connecting means at one end of said shank, and a barbed hook at the other end of said shank, said fishhook having a bait retaining hook disposed between said connecting means and said barbed hook for receiving bait thereon, and holding means associated with said fishhook for retaining bait upon said retaining hook, said fishhook being formed from a single piece of wirelike material, said material being curved backwardly toward said one end at a medial portion thereof to form said bait retaining hook and then folded back on itself to form a blunt end for said bait retaining hook, to prevent impaling and injuring to live bait, said material being curved backwardly toward said one end a second time and having a barb on its distal end to provide said barbed hook, said holding means comprising a helical, cone-shaped spring disposed around said shank and having the largest coil thereof surrounding said fishhook in the general area of said bait retaining hook, a flexible member connected at diametrically opposite points on said coil and drawn tautly across said retaining hook to retain bait placed thereon, said spring being manually compressible in the direction of its axis to move said flexible member away from said retaining hook to allow bait to be placed thereon.

5. A fish lure as set forth in claim 4; a cover tautly fitted over said spring, said flexible member comprising a bottom portion of said cover disposed across said coil, said bottom portion being apertured to allow water to enter said cover for subsurface fishing.

6. A fish lure as set forth in claim 4; a cover tautly fitted over said spring, said flexible member comprising a bottom portion of said cover disposed across said coil, said bottom portion and the opposite end of said cover being in watertight connection with said shank whereby said lure is floatable for surface fishing.

7. A fish lure as set forth in claim 4; a cover fitted over said spring and extending from said largest coil of said spring to the smallest coil thereof, said flexible member comprising a resilient strap connected at the ends thereof to diametrically opposite points on said largest coil, said strap seated at its medial portion within said retaining hook and adapted to retain bait therein.

8. A fish lure as set forth in claim 4; both said retaining hook and said barbed hook being curved in the same lateral direction relative to said shank of said fishhook.

9. A fish lure as set forth in claim 4; said retaining hook and said barbed hook being curved in opposite lateral directions relative to said shank of said fishhook.

References Cited

UNITED STATES PATENTS

| | | | |
|---|---|---|---|
| 58,404 | 10/1866 | Goodwin | 43—44.8 |
| 696,018 | 3/1902 | Edgar | 43—44.8 |
| 1,452,377 | 4/1923 | Hanselman | 43—44.4 |
| 2,454,879 | 11/1948 | Mattingly | 43—44.8 |
| 2,719,379 | 10/1955 | Fritts | 43—44.6 |
| 2,775,058 | 12/1956 | Roberts | 43—44.4 |
| 2,825,174 | 3/1958 | Leinonen | 43—44.8 |

SAMUEL KOREN, *Primary Examiner.*